Figure 1:
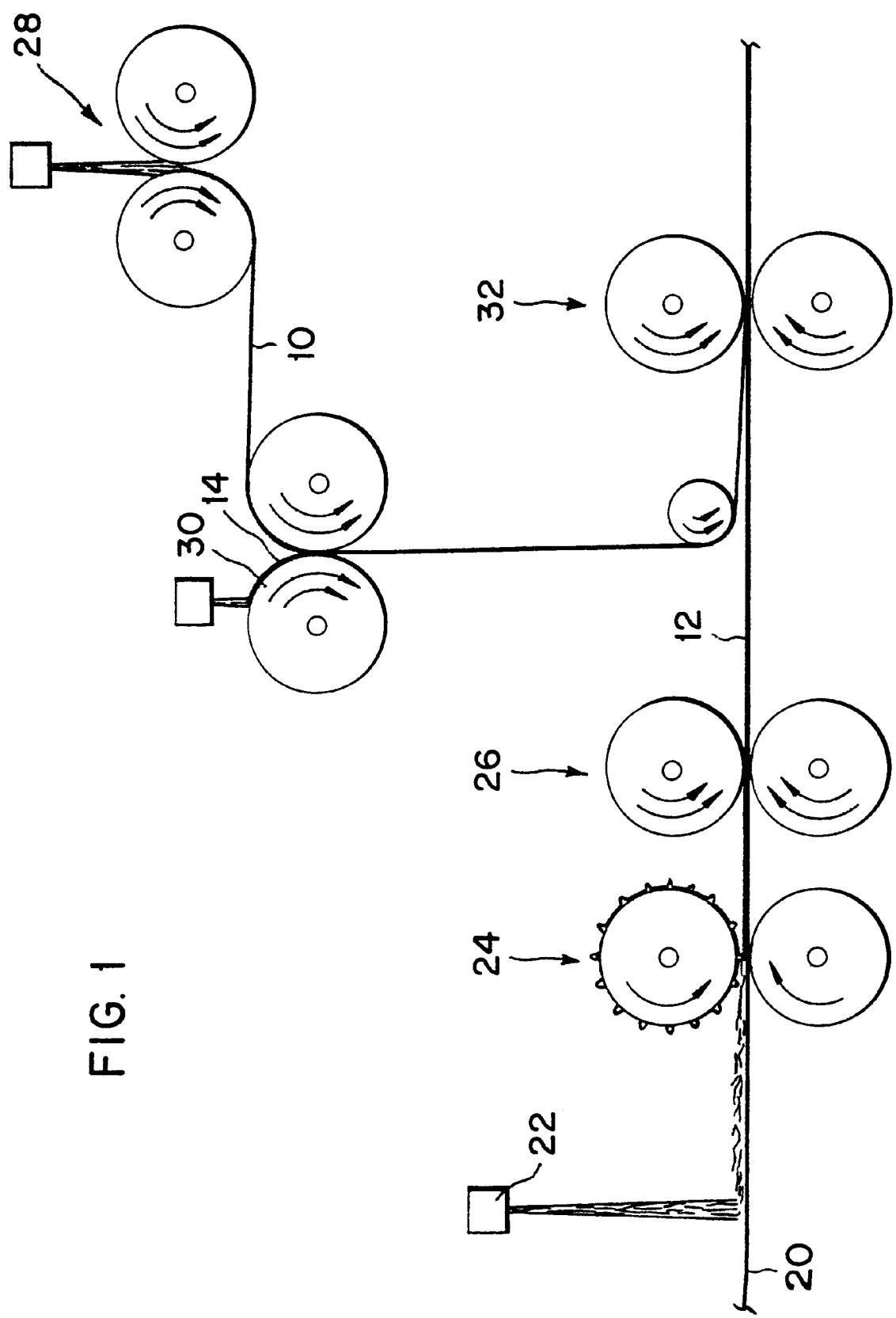

United States Patent

Boich

Patent Number: 5,939,178
Date of Patent: Aug. 17, 1999

[54] PROCESS FOR PRODUCING A MULTILAYERED ELASTIC SHEETLIKE STRUCTURE; AS WELL AS A MULTILAYERED ELASTIC SHEETLIKE STRUCTURE

[75] Inventor: Heinz-Horst Boich, Peine, Germany

[73] Assignee: Corovin GmbH, Peine, Germany

[21] Appl. No.: 08/797,514

[22] Filed: Feb. 6, 1997

[30] Foreign Application Priority Data

Feb. 10, 1996 [DE] Germany .................. 196 04 956

[51] Int. Cl.⁶ ........................... B32B 9/00

[52] U.S. Cl. .............. 428/198; 428/74; 428/77; 428/131; 428/152; 428/184; 428/284; 428/286; 428/297; 428/298; 428/317.9; 156/163; 156/229

[58] Field of Search ............... 428/74, 77, 131, 428/152, 184, 284, 286, 297, 298, 317.9; 156/163, 229

[56] References Cited

FOREIGN PATENT DOCUMENTS 0 321 980  6/1989  European Pat. Off. .

WO 94/14607  7/1994  WIPO .

*Primary Examiner*—Richard Weisberger
*Attorney, Agent, or Firm*—Burns, Doane, Swecker and Mathis, L.L.P.

[57] ABSTRACT

A process for producing a multilayered elastic sheetlike structure; and a multilayered elastic sheetlike structure are described.

The multilayered elastic sheetlike structure comprises at least one elastomeric layer of a film, a sheet or a fibrous structure and at least one layer of bonded, inelastic fibrous web connected to the elastomeric layer at permanent connection sites. The inelastic layer of fibrous web, prior to its connection with the elastomeric layer, is initially drawn, so that the fibers of the inelastic layer of fibrous web essentially are aligned in the direction or initial drawing and that the inelastic layer of fibrous web in the initially-drawn state is connected to the elastomeric layer.

25 Claims, 3 Drawing Sheets

PROCESS FOR PRODUCING A MULTILAYERED ELASTIC SHEETLIKE STRUCTURE; AS WELL AS A MULTILAYERED ELASTIC SHEETLIKE STRUCTURE

The invention relates to a process for producing a multilayered elastic sheetlike structure as well as a multilayered elastic sheetlike structure.

A multilayered elastic sheetlike structure is already known from Patent EP 0 321 980 A. it comprises an inelastic fibre layer or filament layer and an elastic layer. Through a thermal bonding process, the inelastic layer is connected to the extended elastic layer at spaced-apart connection sites and subsequently the entire sheetlike structure is untensioned. In the process, the inelastic fibre or filament layer, at the connection sites, warps up perpendicular to the sheet surface. When the sheetlike structure is extended, this warp is reduced until the fibres of the fibre or filament layer are aligned parallel to the sheet surface.

Furthermore, from Patent DE 42 43 012 A1 a multilayered elastic sheetlike structure is known in which an elastic and an inelastic layer are connected at mutually spaced-apart connection sites and subsequently extended. The elastic layer reverts to its previous state after initial tensioning while the inelastic layer undergoes a permanent extension and warps between the connection sites, perpendicular to the sheet surface. Only fibre materials with high permanent extension are suitable for application as the inelastic layer.

The known sheetlike structures derive the path reserve of their inelastic layer exclusively from the warping of their fibres between the connection sites which decrease as the extension increases, up to the state where the fibres of the inelastic layer are aligned parallel to the sheetlike structure.

It is the object of the invention to specify a process for producing a multilayered elastic sheetlike structure as well as to create a multilayered elastic sheetlike structure which in one direction attains the path reserve of its inelastic layer by alignment of the fibres along the sheet surface.

Because of initial drawing of the bonded inelastic layer of fibrous web, the fibres are essentially aligned in the direction of the direction of initial drawing and retain this alignment even after connection with the elastomeric layer, as long as this is untensioned. Extendability of the compound material transverse to the direction of initial drawing is made possible by the fibres being deflectable between the connection sites with the elastomeric layer in the way of a slidable lattice grate. Depending on the extension, the fibres are aligned away from their original direction along the direction of initial drawing, to the direction of extension. Here, the path reserve is thus derived from the deflection of the fibres on the sheet surface. In this, the thickness of the layers and the surface profile of the inelastic layer do not change.

According to a further development, in addition, prior to connection with the inelastic layer of fibrous web, the elastomeric layer may be extended in the direction of the direction of initial drawing, in the extended state connected with the initially drawn inelastic layer of fibrous web, and subsequently the resulting multilayered sheetlike structure may be untensioned.

This sheetlike structure is extendable in two dimensions: on the one hand in the direction of initial drawing of the inelastic layer of fibrous web and on the other hand transversely to this direction. In this the sheetlike structure, when extended in the direction of the direction of initial drawing, derives the path reserve of its inelastic layer from the warping of the fibres between the connection sites and transversely to this, from the alignment of the fibres of the sheet surface.

In a preferred embodiment the connection area of the elastomeric layer and/or the inelastic layer of fibrous web comprises an irregular adhesive and/or cohesive layer, or a dehesive layer covering a part of the surface, the exception being the connection sites provided. By means of a bonding process, a connection over the entire area between the elastomeric layer and the inelastic layer of fibrous web is created. Finally, with subsequent extension in transverse direction to the direction or initial drawing, and with additional elastomeric layer in the direction of the direction of initial drawing, this layer having been extended during connection with the initially-drawn inelastic layer of fibrous web, areas of the connection covering the entire area are undone again except for permanently remaining connection sites.

This measure has the advantage that during the bonding process which for example may be a thermal bonding or ultrasound bonding process, even pressure can be exerted on the elastomeric layer and the inelastic layer of fibrous web next to it. Thus there is no possibility of damage that might result from point pressure and subsequent evading sideways movement of the material and a resulting reduction in the thickness of the layer at the connection sites provided. This applies in particular if the cross-section of the elastic layer is reduced as a result of extension during the bonding process. In spite of this, permanent connection between inelastic layer of fibrous web and the elastomeric layer only takes place at discrete connection sites, because the dehesive layer or the irregularly adhesive and/or cohesive layer enables detachment of the layers in other areas, as soon as the elastomeric layer is extended transversely to the direction of initial drawing, or untensioned in the direction of initial drawing.

The inelastic layer of fibrous web may be initially drawn along or transverse to the direction of production. Initial drawing along the direction of production is preferred, because on the one hand this facilitates the process of initial drawing and on the other hand—when additional extendability in the direction of production is done without—it facilitates transport on a production line and subsequent processes, because the material does not give way in the direction of production.

The inelastic layer of fibrous web may be subject to initial drawing of up to 50% of the maximum elongation at tear.

This results in far-reaching alignment of all fibres in the direction of initial drawing and also in an increased distance of the bonding points of the bonded web layer which favours subsequent deflectability of the fibres. In addition, the forces required for further drawing are increased, providing greater resistance against over-stretching the joined elastic sheetlike structure.

In practice the inelastic layer of fibrous web can be initially drawn in such a way that with initial drawing along the direction of production, the strength ratio lengthwise to crosswise is from 0.8 to 1.2 up to 20 to 3, and with initial drawing transverse to the direction of production the strength ratio crosswise to lengthwise is from 0.8 to 1.2 to 20 to 3.

To provide the inelastic layer of fibrous web with elasticity in the direction of drawing the elastomeric layer may be extended, prior to its connection to the inelastic layer of fibrous web, by up to 150% of its original length.

Because the layer of fibrous web is inelastic, after untensioning of the elastomeric layer warping of the fibres occurs to the extent of the distance between the connection sites plus the measurement of this extension. However, this warping is relatively insignificant and thus it does not detract visually.

The dehesive or the adhesive and/or cohesive layers may incorporate dyes or colouring pigments. This allows a colour design without having to print the sheetlike structure.

The dehesive layer may cover between 5% and 90% of the connection area. In this way the distance between the connection sites provided and their area may be varied, thus providing a means of influencing the extendability.

Where the elastomeric layer is a film or sheet, it can be of multilayered construction, whereby the melting point of the layer serving as connection area is to be at least 20° C. lower than that of the other layer. In this embodiment the layer of fibrous web only establishes a superficial connection with the elastomeric layer, because, due to the differing melting points, any softening of the part of the layer with the higher melting point and thus any intrusion into this part of the layer by the fibres of the layer of fibrous web can be avoided.

In a practical embodiment the layer serving as the connection area may be made from copolymeric raw materials with a thickness of at least 2.5 $\mu$m and the other layer may be made from elastomeric, polymeric and copolymeric raw materials with a thickness of between 8–100 $\mu$m, preferably between 15 to 80 $\mu$m.

In an alternative embodiment the elastomeric layer being a film or a sheet may be of a heterogeneous construction and comprise elastomeric, polymeric and copolymeric raw materials.

In the case of a heterogeneous construction, the said raw materials, while mixed, are not homogeneous, so that the specific properties of the raw materials, i.e. elastomericity and adhesivity or cohesivity nevertheless remain intact.

In the case of an elastomeric layer comprising a fibrous structure, the fibres may comprise bicomponent fibres whereby the melting point of one of the components is at least 20° C. lower than that of the other component.

In this way it can be ensured that during the bonding process only the components with the lower melting temperature soften, while the other components do not soften, and thus the layer of fibrous web retains its fibrous structure.

In an alternative embodiment the fibrous structure, too, may consist of heterofil fibres, comprising elastomeric, polymeric and copolymeric raw materials.

Below, the invention is explained by means of drawings as follows:

FIG. 1 shows a device for producing a multilayered sheetlike structure

Figure 2:
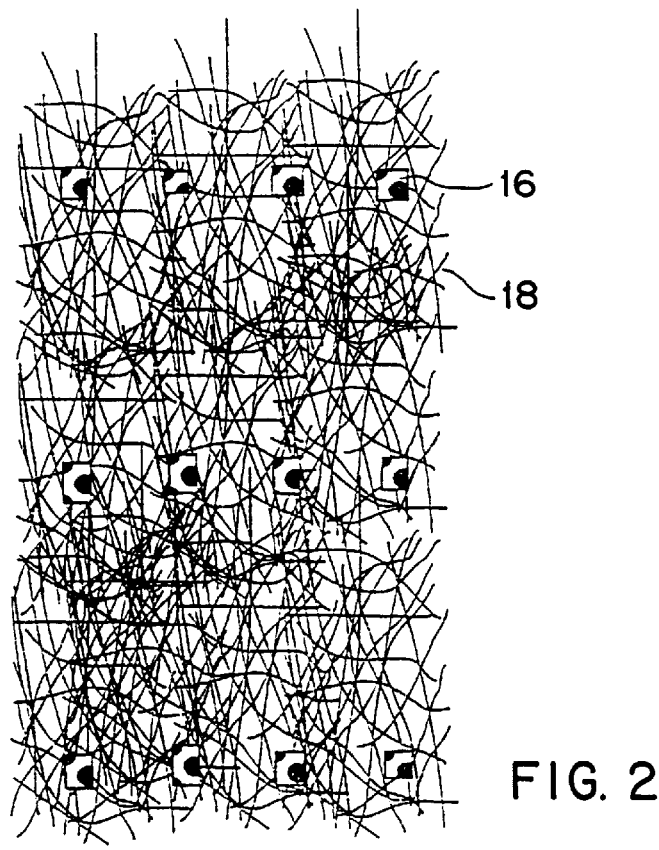
Figure 3:
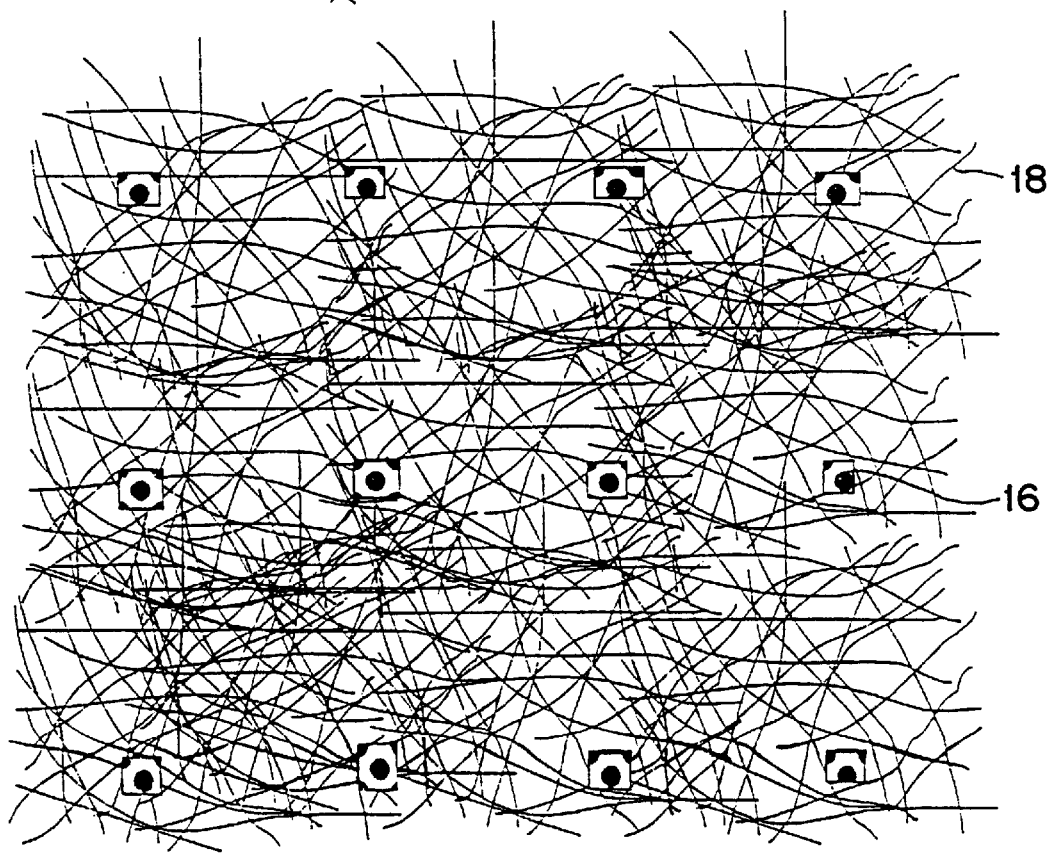
Figure 4:
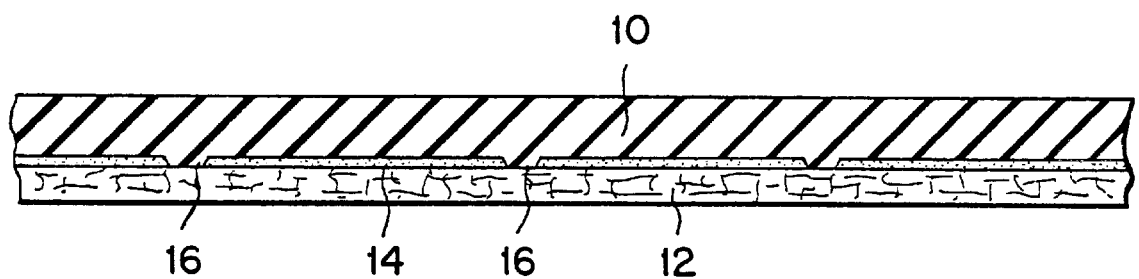
Figure 5:
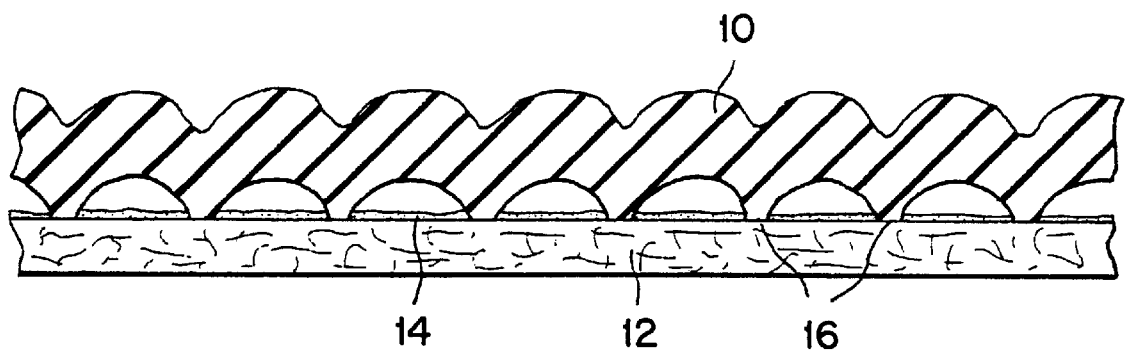

FIG. 2 shows a horizontal projection of a sheetlike structure with an initially-drawn inelastic layer of fibrous web, in an untensioned state FIG. 3 shows a horizontal projection of the sheetlike structure according to FIG. 2, in a tensioned state FIG. 4 shows a section through a sheetlike structure with extendability in the direction of initial drawing, in an tensioned state, and FIG. 5 shows a section through the sheetlike structure according to FIG. 4, in a tensioned state.

FIG. 1 shows a device for producing a multilayered elastic sheetlike structure. On the laydown belt 20 of a laydown device first a web layer is produced; as an alternative this can happen according to the spunbonded web process or the melt-blowing process. To this end, above the laydown belt 20, a nozzle apparatus 22 is provided for the emanating melt. In the case of a spinning device it can be embodied as a spinning beam; and in the case of a melt-blowing device it can be an arrangement of melt-blowing nozzles.

Subsequently the web layer is transported to an arrangement of calender rolls 24 by means of which bonding of the web layer occurs, e.g. by means of thermal bonding or ultrasonic bonding.

Thereupon the bonded web layer 12 is initially drawn in a stretching device 26 comprising rollers with higher feed rate than the rollers of the arrangement of calender rolls 24.

A supply roll or a separate production device 28 supplies an elastomeric sheet 10 which passes over a printing roller 30 and receives a dehesive layer 14 according to a pattern determined by the printing roller 30. In this way the dehesive layer 14 that was applied does not cover the elastomeric sheet 10 over its entire area but leaves :areas which serve as subsequent permanent connection sites 16.

If extendability of the multilayered sheetlike structure is also desired in the direction of initial drawing, then the elastomeric sheet 10 is additionally extended in the direction or production, by transport rollers running at a different speed. Thereupon the elastomeric sheet 10 is brought into contact with the initially-drawn layer of fibrous web 12 and passes through a bonding device 32 with smooth, heated rollers. In the bonding process the elastomeric layer 10 and the layer of fibrous web 12 is permanently contacted at the sites where no dehesive layer 14 was applied, while elsewhere only a temporary connection is established.

If the elastomeric sheet 10 was previously extended in the direction of production, by means of feed rollers of differing speed, then the sheetlike structure is untensioned by feed rollers of differing speed whereupon the layer of fibrous web 12, between the connection sites 16, detaches itself again from the elastomeric layer 10 and warps. Otherwise the temporary connection areas of the sheetlike structure become detached through extension transverse to the direction of production.

FIGS. 1 and 2 show a horizontal projection of a multilayered elastic sheetlike structure with an initially-drawn inelastic fibre layer 12. In FIG. 3 which shows the untensioned state, the fibres of the web layer are predominantly aligned in the direction of initial drawing. In order to illustrate the difference between the untensioned and extended state, the connection sites 16 with the elastomeric layer are shown too. If the sheetlike structure is extended transversely to the direction of initial drawing, then the fibres 18 of the layer of fibrous web 12 swing around the connection sites 16 in the way of pivot points and gradually change their alignment from an alignment originally in the direction of initial drawing to an alignment in the direction of extension.

In the case of slight extension, the pivot angle is relatively small and as a result no resistance to the extension occurs and only the properties of the elastomeric layer determine the extension behaviour. The further the fibres 18 are aligned in the direct of extension, the more the resistance to further extension increases until finally the path reserve is exhausted. From the very beginning any extension in the direction of drawing meets with substantial resistance. Because, due to the initial drawing, the fibres show increased resistance to further drawing, there is also a safeguard against overstretching once the path reserve is exhausted.

FIGS. 4 and 5 show a section through a multilayered elastic sheetlike structure comprising an elastomeric layer 10 and a layer of fibrous web 12. The elastomeric layer 10 carries a dehesive coating 14 applied in the shape of a pattern. This pattern leaves areas free which are provided to serve as connection sites 16 of the two layers 10, 12. At these provided connection sites 16 the elastomeric layer 10 is attached to the layer of fibrous web 12 by means of adhesive or by a surface-melt process.

Additionally the sheetlike structure shown in FIGS. 4 and 5 is extendable in the direction of initial drawing. FIG. 4 shows the tensioned state and FIG. 5 the untensioned state. In this representation the layer of fibrous web 12 adheres to the elastomeric layer 10 at the connection sites 16, while in the remaining areas which have been coated by the dehesive layer 14 the layer of fibrous web 12 does not adhere and warps.

I claim:

1. A process for producing a multilayered elastic product comprising at least one elastomeric layer and at least one fibrous web layer bonded at spaced points to said at least one elastomeric layer comprising (a) initially drawing a fibrous web layer so as to substantially align the fibers present therein in the direction of said drawing and (b) subsequently while said fibrous web is in said drawn state bonding said fibrous web at spaced points to an elastomeric layer to form a multilayered elastic product that is extendable in the direction transverse to the direction said fibrous web component initially was drawn with the fibers of said fibrous web being substantially deflectable and thereby free to change alignment to the transverse direction intermediate said spaced bonding points.

2. A process according to claim 1 wherein said at least one elastomeric layer is initially drawn in the direction of the initial drawing of step (a) and is in said drawn state during step (b), and subsequently said resulting multilayered elastic product is provided in an untensioned state.

3. A process according to claim 1 wherein during step (b) said layers are bonded while in a smooth state with said bonding being achieved through the use of an adhesive that is provided at spaced points.

4. A process according to claim 1 wherein during step (b) said layers are bonded while in a smooth state and while separated by a dehesive layer which covers surface areas of said layers except where bonding takes place at spaced points.

5. A process according to claim 1 wherein said elastomeric layer is initially drawn in step (a) in the direction of production.

6. A process according to claim 1 wherein said elastomeric layer is initially drawn in step (a) in the direction transverse to the direction of production.

7. A process according to claim 1 wherein said elastomeric layer is initially drawn in step (a) at least 50 percent of the maximum elongation at tear.

8. A process according to claim 1 wherein said elastomeric layer is initially drawn in step (a) so as to produce strength ratios of lengthwise to crosswise and crosswise to lengthwise of 0.8 to 1.2 to 20 to 3.

9. A process according to claim 1 wherein said elastomeric layer is initially drawn in step (a) to achieve an extension of at least 150 percent of its length prior to said drawing.

10. A process according to claim 4 wherein said dehesive layer covers 5 to 90 percent of the area of said layers.

11. A multilayered elastic sheet product comprising at least one fibrous web layer bonded at spaced points to at least one elastomeric layer wherein said fibrous web layer initially was drawn so as to substantially align the fibers present therein in the direction of said drawing and subsequently while said fibrous web layer was in said drawn state was bonded at spaced points to said elastomeric layer with said resulting elastic sheet product being extendable in the direction transverse to the direction said fibrous web was drawn with said fibers of said fibrous web being substantially deflectable and thereby free to change their alignment to the transverse direction intermediate said spaced bonding points.

12. A multilayered elastic sheet product according to claim 11 wherein said elastomeric layer was initially drawn when bonded with said fibrous web layer.

13. A multilayered elastic sheet product according to claim 11 wherein said layers were bonded while in a smooth state with said bonding being achieved through the use of an adhesive that is provided at spaced points.

14. A multilayered elastic sheet product according to claim 11 wherein said layers were bonded while in the smooth state and while separated by a dehesive layer which covers surface areas of said layers except where bonding was achieved at spaced points.

15. A multilayered elastic sheet product according to claim 11 wherein said elastomeric layer was drawn in the direction of production when bonded at said spaced points.

16. A multilayered elastic sheet product according to claim 11 wherein said elastomeric layer was drawn in the direction transverse to the direction of production when bonded at said spaced points.

17. A multilayered elastic sheet product according to claim 11 wherein said elastomeric layer was drawn at least 50 percent of the maximum elongation to tear when bonded at said spaced points.

18. A multilayered elastic sheet product according to claim 11 wherein said elastomeric layer when bonded was drawn so as produce strength ratios of lengthwise to crosswise and crosswise to lengthwise of 0.8 to 12 to 20 to 3.

19. A multilayered elastic sheet product according to claim 11 wherein said elastomeric layer when bonded was drawn to achieve an extension of at least 150 percent of its length prior to said drawing.

20. A multilayered elastic sheet product according to claim 14 wherein said dehesive layer covered 5 to 90 percent of the area of said layers when bonding took place.

21. A multilayered elastomeric sheet product according to claim 11 wherein said elastomeric layer was of a multilayer construction and included at least one layer having a melting point at least 20° C. lower than other layers and with bonding having been created through the application of heat.

22. A multilayered elastic sheet product according to claim 21 wherein said elastomeric layer of multilayer construction includes a layer possessing a lower melting point of a copolymeric material having a thickness of at least 2.5 $\mu$m and the remainder has a thickness of 8 to 100 $\mu$m.

23. A multilayered elastic sheet product according to claim 11 wherein said elastomeric layer is fibrous in nature and comprises bicomponent fibers wherein one of the components has a melting point at least 20° C. below that of the remainder of said bicomponent fibers.

24. A multilayered elastic sheet product according to claim 23 wherein said lower melting component is a copolymer.

25. A multilayered elastic sheet product according to claim 11 wherein said elastomeric layer is of a fibrous heterofil construction.

* * * * *